US011990272B2

(12) United States Patent
Yoshidome et al.

(10) Patent No.: US 11,990,272 B2
(45) Date of Patent: May 21, 2024

(54) MAGNETIC CORE, MAGNETIC COMPONENT, AND ELECTRONIC DEVICE

(71) Applicant: TDK CORPORATION, Tokyo (JP)

(72) Inventors: Kazuhiro Yoshidome, Tokyo (JP); Hiroyuki Matsumoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 220 days.

(21) Appl. No.: 17/209,725

(22) Filed: Mar. 23, 2021

(65) Prior Publication Data

US 2021/0296031 A1 Sep. 23, 2021

(30) Foreign Application Priority Data

Mar. 23, 2020 (JP) ................................ 2020-051884
Jan. 13, 2021 (JP) ................................ 2021-003703

(51) Int. Cl.

| | |
|---|---|
| ***H01F 3/08*** | (2006.01) |
| ***B22F 1/052*** | (2022.01) |
| ***B22F 1/07*** | (2022.01) |
| ***B22F 1/16*** | (2022.01) |
| ***C22C 45/02*** | (2006.01) |
| ***H01F 1/147*** | (2006.01) |

(52) U.S. Cl.

CPC ................ *H01F 3/08* (2013.01); *B22F 1/052* (2022.01); *B22F 1/07* (2022.01); *C22C 45/02* (2013.01); *H01F 1/147* (2013.01); *B22F 1/16* (2022.01); *B22F 2304/10* (2013.01)

(58) Field of Classification Search

CPC .......... H01F 1/12–15391; B22F 1/0003; B22F 1/052; B22F 1/08; B22F 1/09

See application file for complete search history.

(56) References Cited

U.S. PATENT DOCUMENTS

| | | | | |
|---|---|---|---|---|
| 2004/0113744 | A1 | 6/2004 | Watanabe et al. | |
| 2016/0336104 | A1* | 11/2016 | Noguchi | H01F 1/24 |
| 2021/0183548 | A1* | 6/2021 | Ishida | H01F 1/24 |
| 2021/0193362 | A1* | 6/2021 | Tsuchiya | H01F 1/26 |
| 2021/0241951 | A1* | 8/2021 | Meguro | H01F 41/0246 |
| 2022/0359109 | A1* | 11/2022 | Ke | B22F 1/08 |

FOREIGN PATENT DOCUMENTS

| | | | | |
|---|---|---|---|---|
| JP | 2003-309024 A | 10/2003 | | |
| JP | 2004-197218 A | 7/2004 | | |
| JP | 2004-363466 A | 12/2004 | | |
| JP | 5110660 B2 | 12/2012 | | |
| JP | 2019182950 A | * | 10/2019 | |
| WO | WO-2018179812 A1 | * | 10/2018 | C22C 38/00 |

* cited by examiner

*Primary Examiner* — Alexandra M Moore
*Assistant Examiner* — Austin Pollock
(74) *Attorney, Agent, or Firm* — Oliff PLC

(57) ABSTRACT

To obtain a magnetic core having an improved relative magnetic permeability and an improved withstand voltage property and the like. The magnetic core contains large particles observed as soft magnetic particles having a Heywood diameter of 5 μm or more and 25 μm or less and small particles observed as soft magnetic particles having a Heywood diameter of 0.5 μm or more and 3 μm or less in a cross section. 1.00≤A1≤1.50, 1.30≤A2≤2.50, and A1≤A2 are satisfied, in which an average aspect ratio of the large particles is A1 and an average aspect ratio of the small particles is A2.

8 Claims, 1 Drawing Sheet

MAGNETIC CORE, MAGNETIC COMPONENT, AND ELECTRONIC DEVICE

BACKGROUND OF THE INVENTION

The present invention relates to a magnetic core, a magnetic component, and an electronic device.

Patent Document 1 describes an inductor in which a dust core obtained by pressing a metal magnetic powder and a coil portion are integrally molded. However, when the metal magnetic powder is used, a core loss tends to be large. Here, the core loss is reduced by using an amorphous alloy powder as the metal magnetic powder. However, in this case, it is known that it is difficult to improve a density of the dust core during molding.

Patent Document 2 and Patent Document 3 propose that a powder obtained by mixing a crystalline alloy magnetic powder and an amorphous alloy magnetic powder is used.

Patent Document 4 discloses that an inductor and the like having a core loss lower than that in the related art can be provided by using an amorphous soft magnetic powder having a high average value of practical sphericity.

[Patent Document 1] JP 2003-309024 A

[Patent Document 2] JP 2004-197218 A

[Patent Document 3] JP 2004-363466 A

[Patent Document 4] JP 5110660 B

BRIEF SUMMARY OF INVENTION

An object of the present invention is to obtain a magnetic core and the like having an improved withstand voltage property when a relative magnetic permeability is high.

In order to achieve the above object, a magnetic core according to the present invention contains:

large particles observed as soft magnetic particles having a Heywood diameter of 5 μm or more and 25 μm or less and small particles observed as soft magnetic particles having a Heywood diameter of 0.5 μm or more and 3 μm or less in a cross section, wherein $$1.00 \le A1 \le 1.50,$$

$$1.30 \le A2 \le 2.50, \text{ and}$$

$$A1 < A2 \text{ are satisfied,}$$

in which an average aspect ratio of the large particles is A1 and an average aspect ratio of the small particles is A2.

It has been found that a withstand voltage property of the magnetic core according to the present invention can be improved while maintaining a high relative magnetic permeability thereof when large particles and small particles having specific average aspect ratios are used and the average aspect ratio of the small particles is made larger than the average aspect ratio of the large particles.

In the cross section, a maximum value of a Heywood diameter of soft magnetic particles other than the large particles and the small particles may be 40 μm or less.

An average elliptic circularity of the large particles in the cross section may be 0.93 or more.

The large particles may contain nanocrystals.

The small particles may contain Fe as a main component.

The small particles may contain Fe and at least one selected from Si and Ni as main components.

A magnetic component of the present invention includes the above magnetic core.

An electronic device of the present invention includes the above magnetic core.

DETAILED DESCRIPTION OF INVENTION

Figure 1:
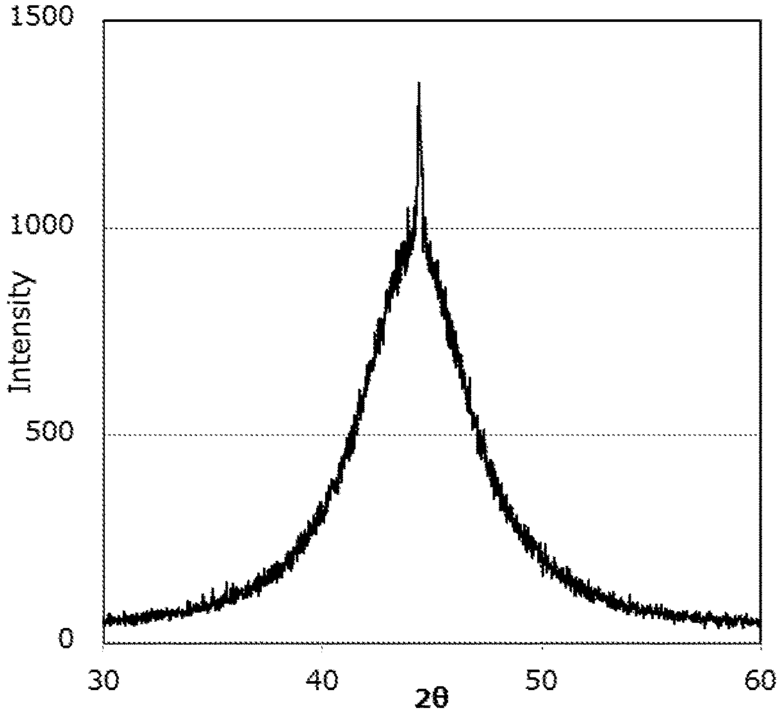
FIG. 1 is an example of a chart obtained by X-ray crystal structure analysis.

Hereinafter, an embodiment of the present invention will be described.

A magnetic core according to the present embodiment contains large particles observed as soft magnetic particles having a Heywood diameter of 5 μm or more and 25 μm or less and small particles observed as soft magnetic particles having a Heywood diameter of 0.5 μm or more and 3 μm or less in a cross section.

A total area ratio of the large particles to the entire cross section may be 10% or more, or 30% or more. A total area ratio of the small particles may be 10% or more, or 15% or more. When the total area ratio of the large particles is S1 and the total area ratio of the small particles is S2, S1:S2 may be 1:9 to 9:1.

The Heywood diameter is a circle equivalent diameter of a projected area. When an area of a soft magnetic particle in the cross section is S, the Heywood diameter of the soft magnetic particle in the present embodiment is $(4S/\pi)^{1/2}$.

Then, a magnetic core according to the present embodiment is a magnetic core that satisfies $$1.00 \le A1 \le 1.50,$$

$$1.30 \le A2 \le 2.50, \text{ and}$$

$$A1 < A2,$$

in which an average aspect ratio of the large particles is A1 and an average aspect ratio of the small particles is A2.

The large particles and the small particles according to the present embodiment may have a covering portion on surfaces thereof. The covering portion may be an insulating coating film. A type of the covering portion is not particularly limited, and any covering portion formed by coating usually used in this technical field may be used. Examples thereof include iron-based oxides, phosphates, silicates (water glass), soda lime glass, borosilicate glass, lead glass, aluminosilicate glass, borate glass, and sulfate glass. Examples of the phosphates include magnesium phosphate, calcium phosphate, zinc phosphate, manganese phosphate, and cadmium phosphate. Examples of the silicates include sodium silicate. A thickness of the covering portion is also not particularly limited. An average thickness of the covering portion formed on the large particles may be 5 nm or more and 100 nm or less. An average thickness of the covering portion formed on the small particles may be 5 nm or more and 100 nm or less. The thickness of the covering portion is significantly smaller than a particle diameter of the above particles, and thus does not substantially affect the Heywood diameter and the aspect ratio of the above particles.

The magnetic core according to the present embodiment may contain a resin used as a binder. A type of the resin is not particularly limited. Examples thereof include a silicone resin and an epoxy resin. A content of the resin in the magnetic core is also not particularly limited. For example, the content may be 1.5 parts by mass or more and 5.0 parts or less by mass with respect to 100 parts by mass of the soft magnetic particles.

Hereinafter, a method of observing the cross section of the magnetic core will be described.

First, the cross section obtained by cutting the magnetic core is polished to prepare an observation surface. Next, the observation surface is observed by SEM, and an SEM image is taken.

A size of an observation area by SEM is not particularly limited. The size of the observation area may be large enough to observe any 100 or more, preferably 1000 or more large particles. Different observation areas are set and then an SEM image of each observation area is taken, and the above number of large particles may be observed in total of SEM images.

A magnification of the SEM image is not particularly limited, and the magnification is sufficient as long as various parameters according to the present embodiment can be measured. For example, the magnification may be 200 times or more and 5000 times or less.

The aspect ratio of each soft magnetic particle is calculated by dividing a length of a major axis by a length of a minor axis.

A magnitude of the average aspect ratio A1 of the large particles, a magnitude of the average aspect ratio A2 of the small particles, and a magnitude relation between A1 and A2 are all as described above, and therefore, a withstand voltage property of the magnetic core according to the present embodiment can be improved while maintaining the relative magnetic permeability thereof. $A2-A1\geq0.01$ may also be satisfied.

Reasons why the relative magnetic permeability and the withstand voltage property of the magnetic core according to the present embodiment are improved will be shown below.

The withstand voltage property of the magnetic core is more likely to be improved when a contact between the soft magnetic particles in the magnetic core is a surface contact, compared to when the contact is a point contact. A contact area between the soft magnetic particles is larger in the case of surface contact than in the case of point contact. Here, the larger the contact area between the soft magnetic particles, the smaller a voltage applied per unit area of a portion where the soft magnetic particles are in contact with each other when a voltage is applied. That is, when the contact between the soft magnetic particles is the surface contact, there are few places where an electric field is concentrated when a voltage is applied. Accordingly, when the contact between the soft magnetic particles is the surface contact, the withstand voltage property of the magnetic core is increased. The greater a degree to which the soft magnetic particles contained in the magnetic core are deformed from a spherical shape, the more likely the contact of the soft magnetic particles is the surface contact. That is, it is considered that the larger the aspect ratio of the soft magnetic particles, the easier the withstand voltage property of the magnetic core is improved.

However, at the same time, when the aspect ratio of the soft magnetic particles is too large, the electric field tends to concentrate in a long axis direction of the soft magnetic particles when a voltage is applied. The concentration of the electric field reduces the withstand voltage property of the magnetic core. Therefore, even when the aspect ratios of all the soft magnetic particles are increased, it is difficult to improve the withstand voltage property of the magnetic core, and conversely, the withstand voltage property may decrease.

The present inventors have found that a phenomenon that the withstand voltage property of the magnetic core decreases as the aspect ratio of the soft magnetic particles increases tends to occur in the soft magnetic particles having a large particle diameter. Then, the present inventors have found that the withstand voltage property is improved by deforming the small particles more than the large particles to increase the aspect ratio of the small particles more than the aspect ratio of the large particles. Details of reasons why the withstand voltage property is improved by increasing the aspect ratio of the small particles are unknown. However, it is considered that in a case where the aspect ratio of the small particles is increased to increase the surface contact ratio as compared with a case of increasing the aspect ratio of the large particles to increase a surface contact ratio, the number of places where the electric field is concentrated when a voltage is applied decreases especially for the large particles. Then, it is considered that a decrease in the withstand voltage property is prevented by reducing the places where the electric field is concentrated in the large particles.

Furthermore, generally, when a filling rate of the soft magnetic particles is improved, the relative magnetic permeability tends to increase. However, when the filling rate of the soft magnetic particles is improved, a distance between the soft magnetic particles becomes narrower. Therefore, when the filling rate of the soft magnetic particles is improved, the number of the places where the electric field is concentrated increases when a voltage is applied. Accordingly, generally, the withstand voltage property is deteriorated due to the improvement of the filling rate of the soft magnetic particles.

That is, in the related art, the relative magnetic permeability is improved by improving the filling rate, but since the withstand voltage property deteriorates due to the improvement of the filling rate, it is difficult to improve the withstand voltage property while maintaining high relative magnetic permeability. The present inventors have succeeded in improving the withstand voltage property while maintaining high relative magnetic permeability by keeping both the aspect ratio of the large particles and the aspect ratio of the small particles within specific ranges, and making the aspect ratio of the small particles larger than the aspect ratio of the large particles.

The method for calculating the filling rate of the magnetic core is not particularly limited. For example, the above observation surface is observed using SEM. Then, an area ratio of the particles with respect to an area of the entire observation surface is calculated. Then, in the present embodiment, the area ratio and the filling rate are considered to be equal, and the area ratio is defined as the filling rate.

In the cross section, a maximum value of a Heywood diameter of soft magnetic particles that other than the large particles and the small particles may be 40 μm or less. In other words, the largest Heywood diameter of the soft magnetic particles in the cross section may be 40 μm or less.

The largest Heywood diameter of the soft magnetic particle in the cross section may be 25 μm or less. That is, soft magnetic particles having a Heywood diameter larger than that of the large particles may not be observed in the cross section.

When the maximum value of the Heywood diameter of the soft magnetic particles that other than the large particles and the small particles is more than 40 μm, it becomes difficult to improve the withstand voltage property of the magnetic core. This is because when soft magnetic particles having a large Heywood diameter are contained in the magnetic core, there is a portion where the number of portions between the particles per unit length in a direction in which a voltage is applied decreases. In particular, when a resin is filled between the particles, a difference in the withstand voltage property tends to be large between a case where the soft magnetic particles having a large Heywood diameter are contained and a case where the soft magnetic particles having a large Heywood diameter are not contained.

An average elliptic circularity of the large particles in the cross section may be 0.930 or more, and more preferably 0.950 or more.

In order to evaluate a shape of the particle, a circularity calculated by $2\times(\pi\times\text{cross-sectional area})^{1/2}/(\text{perimeter of cross section})$ is often used, but in the present embodiment, the shape of the particle is evaluated by using the elliptic circularity. The elliptic circularity is obtained by $4\times\text{cross-sectional area}/(\text{major axis}\times\text{minor axis}\times\pi)$.

Generally, when the particle is flat, the circularity thereof is low. However, even when the particle is flat, the elliptic circularity thereof is high. Meanwhile, the circularity of the particle may not be low even when the particle has a dented shape or a distorted shape. However, when the particle has a dented shape or a distorted shape, the elliptic circularity thereof is low. When the particle has a shape having large irregularities, both the circularity and the elliptic circularity thereof are low. That is, in order to evaluate whether the particle is deformed other than flat when viewed from a perfect circle, for example, whether the particle has dents, distortions, or irregularities, it is preferable to use the elliptic circularity.

Here, whether the large particles contained in the magnetic core are flat does not easily affect the withstand voltage property. In contrast, whether the large particles are deformed other than flat, for example, whether the large particles contained in the magnetic core have a dented shape, a distorted shape, or a large irregularity, easily affects the withstand voltage property. This is because the withstand voltage property of the magnetic core improves as there are fewer places where the electric field concentrates when a voltage is applied, and the number of places where the electric field concentrates does not easily depend on whether the large particles are flat, and easily depends on whether the large particles are deformed other than flat.

A fine structure inside the soft magnetic particle is not particularly limited. For example, the soft magnetic particles may have a structure containing an amorphous material, or may have a structure composed of crystals. It is preferable that the large particles have a nano-hetero structure in which the amorphous material contains initial microcrystals having an average crystal grain diameter of 0.3 nm or more and 10 nm or less. When the soft magnetic particles have a structure composed of only an amorphous material or a nano-hetero structure, an amorphization rate X described later is 85% or more. When the soft magnetic particles have a structure composed of crystals, the amorphization rate X described later is less than 85%. Under the condition of substantially the same filling rate, in the case where the large particles have the nano-hetero structure, the relative magnetic permeability thereof is improved as compared with that in the case where the large particles have a structure composed of only an amorphous material. Furthermore, it is preferable that the large particles have a structure composed of crystals having an average crystal grain diameter of 1 nm or more and 30 nm or less (a nanocrystal structure) and having a maximum crystal grain diameter of 100 nm or less. Under the condition of substantially the same filling rate, the relative magnetic permeability of the magnetic core in which the large particles have a nanocrystal structure is further improved. The soft magnetic particles containing crystals, especially nanocrystals, usually contain a large number of crystals in one particle. That is, the particle diameter and the crystal grain diameter of the soft magnetic particles are different. A method for calculating the crystal grain diameter is not particularly limited. Examples thereof include a method for calculating the crystal grain diameter by analyzing a half-value width by XRD measurement and evaluating a crystallite size, and a method for calculating the crystal grain diameter by observing crystals using TEM.

When the soft magnetic particles have the structure composed of an amorphous material, the soft magnetic particles may contain, for example, a main component having a composition formula $(Fe_{(1-(\alpha+\beta))}X1_{\alpha}X2_{\beta})_{(1-(a+b+c+a+e+f))}M_aB_bP_cSi_dC_eS_f$.

X1 may be one or more selected from the group consisting of Co and Ni.

X2 may be one or more selected from the group consisting of Al, Mn, Ag, Zn, Sn, As, Sb, Cu, Cr, Bi, N, O, and rare earth elements.

M may be one or more selected from the group consisting of Nb, Hf, Zr, Ta, Mo, W, Ti, and V.

$0\leq a\leq 0.14$, $0\leq b\leq 0.20$, $0\leq c\leq 0.20$, $0\leq d\leq 0.14$, $0\leq e\leq 0.20$, $0\leq f\leq 0.02$, $0.70\leq 1-(a+b+c+d+e+f)\leq 0.93$, $\alpha\geq 0$, $\beta\geq 0$, and $0\leq\alpha+\beta\leq 0.50$ may be satisfied. The above composition formula is expressed by atomic number ratios.

Furthermore, the nanocrystals contained in the soft magnetic particles (particularly the large particles) may be Fe-based nanocrystals. The Fe-based nanocrystals are crystals having an average crystal grain diameter of a nano-order (specifically, 0.1 nm or more and 100 nm or less) and a Fe crystal structure of bcc (body-centered cubic lattice structure). A method for calculating the average crystal grain diameter of the Fe-based nanocrystals is not particularly limited. Examples thereof include a method for calculating the crystal grain diameter by analyzing a half-value width by XRD measurement and evaluating a crystallite size, and a method for calculating the crystal grain diameter by observing crystals using TEM. A method for confirming that the crystal structure is bcc is also not particularly limited. Examples thereof include a method for confirming using XRD and a method for confirming by analyzing an electron beam diffraction pattern obtained using TEM.

In the present embodiment, the Fe-based nanocrystals may have an average crystal grain diameter of 1 nm to 30 nm. The soft magnetic particles having a structure composed of such Fe-based nanocrystals tend to have a high saturation magnetic flux density and a low coercive force. That is, the soft magnetic properties are likely to be improved. That is, containing the soft magnetic particles facilitates the magnetic core to have a low coercive force and a high relative magnetic permeability. Furthermore, since the saturation magnetic flux density of the magnetic core containing the soft magnetic particles is increased, a DC bias characteristic of the magnetic core is improved. Accordingly, it is easy to improve the properties of the magnetic core by using the soft magnetic particles having the structure composed of Fe-based nanocrystals.

When the soft magnetic particles have the structure composed of Fe-based nanocrystals, the soft magnetic particle may contain, for example, a main component having a composition formula $(Fe_{(1-(\alpha+\beta))}X1_{\alpha}X2_{\beta})_{(1-(a+b+c+a+e+f))}M_aB_bP_cSi_dC_eS_f$.

X1 may be one or more selected from the group consisting of Co and Ni.

X2 may be one or more selected from the group consisting of Al, Mn, Ag, Zn, Sn, As, Sb, Cu, Cr, Bi, N, O, and rare earth elements.

M may be one or more selected from the group consisting of Nb, Hf, Zr, Ta, Mo, W, Ti, and V.

$0 \leq a \leq 0.14$, $0 \leq b \leq 0.20$, $0 \leq c \leq 0.20$, $0 \leq d \leq 0.14$, $0 \leq e \leq 0.20$, $0 \leq f \leq 0.02$, $0.70 \leq 1-(a+b+c+d+e+f) \leq 0.93$, $\alpha \geq 0$, $\beta \geq 0$, and $0 \leq \alpha+\beta \leq 0.50$ may be satisfied. The above composition formula is expressed by atomic number ratios.

In a method for producing the magnetic core described later, when a soft magnetic powder containing the soft magnetic particles having the above composition is heat-treated, the Fe-based nanocrystals are likely to be precipitated from the soft magnetic particles. In other words, the soft magnetic metal particles having the above composition can be easily used as a starting material for the soft magnetic metal powder having the soft magnetic particles from which the Fe-based nanocrystals are precipitated.

When the Fe-based nanocrystals are precipitated from the soft magnetic particles by a heat treatment, the soft magnetic particles before the heat treatment may have the structure composed of only an amorphous material, or may have the nano-hetero structure in which the initial microcrystals are contained in the amorphous material. The initial microcrystals may have an average crystal grain diameter of 0.3 nm or more and 10 nm or less. When the soft magnetic particles have the structure composed of only an amorphous material or the nano-hetero structure, the amorphization rate X described later is 85% or more.

It is preferable that small particles contain Fe as a main component. It is preferable to contain Fe and at least one selected from Si and Ni as main components.

Containing Fe as the main component means that a content of Fe in the entire soft magnetic particles is 50 at % or more and 100 at % or less.

Containing Fe and at least one selected from Si and Ni as the main components means that the soft magnetic particles contain at least Fe and at least one selected from Si and Ni, and that a total content of Fe, Si, and Ni in the entire soft magnetic particles is 50 at % or more and 100 at % or less. The content of Fe in this case may be 15 at % or more and 95 at % or less. A total content of Si and Ni may be 3 at % or more and 90 at % or less. Types of elements other than the main components are not particularly limited. For example, Co, Cr, Al, and the like may be contained.

When the small particles have the above composition, it is possible to prepare a magnetic core having a high magnetic property. That is, when the magnetic core contains small particles containing Fe as a main component, it is possible to improve the saturation magnetic flux density of the small particles. Therefore, it is possible to improve the saturation magnetic flux density of the entire magnetic core, and it is possible to improve the DC bias characteristic of the magnetic core. When the magnetic core contains small particles containing Fe and at least one selected from Si and Ni as main components, it is possible to improve the relative magnetic permeability of the small particles. Therefore, it is possible to improve the relative magnetic permeability of the entire magnetic core.

A method for producing the magnetic core according to the present embodiment is shown below, but the method for producing the magnetic core is not limited to the following method.

First, the soft magnetic metal powder containing the soft magnetic particles according to the present embodiment is prepared. The soft magnetic metal powder according to the present embodiment can be obtained by mixing a soft magnetic metal powder most of which eventually becomes large particles and a soft magnetic metal powder most of which eventually becomes small particles.

The soft magnetic metal powder most of which eventually becomes large particles can be prepared by, for example, a gas atomizing method.

In the gas atomizing method, a molten metal obtained by melting a raw metal is pulverized by the gas atomizing method to prepare the soft magnetic metal powder. A composition of the molten metal is the same as a composition of the large particles to be finally obtained. At this time, the molten metal is dropped from a container in which a discharge port is formed toward a cooling unit. A temperature of the molten metal is an injection temperature. The injection temperature is not particularly limited. For example, the injection temperature may be 1200° C. or higher and 1600° C. or lower. The higher the injection temperature, the easier the average aspect ratio approaches 1 and the smaller the average particle diameter.

A gas injection nozzle provided with a gas injection port is arranged so as to surround the discharge port. From the gas injection port, a high-pressure gas (gas having an injection pressure (gas pressure) of 2.0 MPa or more and 10 MPa or less) is injected toward the molten metal dropped through the discharge port. As a result, the molten metal becomes a large number of droplets. By controlling the pressure of the high-pressure gas at this time, the particle diameter of the finally obtained soft magnetic metal powder and the shape of the soft magnetic metal powder can be changed. Specifically, under the condition of the same injection amount of the molten metal, the higher the pressure of the high-pressure gas, the smaller the particle diameter of the finally obtained soft magnetic metal powder. That is, the particle diameter of the soft magnetic metal powder and the shape of the soft magnetic metal powder can be changed by a ratio of the pressure of the high-pressure gas to the injection amount of the molten metal.

As the gas injected from the gas injection port, an inert gas such as nitrogen gas, argon gas, or helium gas, or a reducing gas such as ammonia decomposed gas is preferred. When the molten metal is difficult to oxidize, air may be used.

A shape of the cooling unit into which the molten metal is dropped is not particularly limited, and for example, the cooling unit may be a cylindrical body in which a coolant flow that collides with the molten metal is formed. In this case, in addition to controlling the pressure of the high-pressure gas described above, by controlling the injection amount of the molten metal and a water pressure of the coolant flow, the particle diameter of the large particles and the average aspect ratio of the large particles in the finally obtained magnetic core can be changed. That is, the particle diameter and the average aspect ratio of the large particles are controlled by controlling a balance among the injection amount of the molten metal, the pressure of the high-pressure gas, and the water pressure of the coolant flow. The injection amount of the molten metal may be 0.5 kg/min or more and 4.0 kg/min or less, and the water pressure may be 5.0 MPa or more and 20.0 MPa or less. Specifically, the larger the injection amount, the larger the particle diameter of the large particle tends to be. The smaller the water pressure, the easier the average aspect ratio of the large particles approaches 1. That is, when changing the aspect ratio of the particles while not changing the particle diameter thereof, it is necessary to appropriately adjust the injection amount, the pressure of the high-pressure gas, and the water pressure of the coolant flow.

The molten metal discharged into the coolant flow collides with the coolant flow and is further divided and fined. As the molten metal is fined, the molten metal is cooled and solidified and a shape of the fine molten metal is changed, so that a solid soft magnetic metal powder is obtained. The soft magnetic metal powder discharged together with the coolant is separated from the coolant and taken out into an external storage tank or the like. A type of the coolant is not particularly limited. For example, cooling water may be used. When the coolant is not used, the soft magnetic metal powder most of which eventually becomes large particles tends to contain coarse crystals having a crystal grain diameter of more than 100 nm.

The shorter a time from the dropping of the molten metal to the collision with the coolant flow, the less likely the molten metal is oxidized. Then, a quenching effect is promoted, and it is easy to become amorphous.

The obtained soft magnetic metal powder may be heat-treated. Heat treatment conditions are not particularly limited. For example, the heat treatment may be performed at 400° C. to 700° C. for 0.1 to 10 hours. By performing the heat treatment, when the fine structure of the particles is the structure composed of only an amorphous material or the nano-hetero structure in which initial microcrystals are contained in the amorphous material, the fine structure of the particles tends to be a structure containing nanocrystals. Then, the coercive force of the soft magnetic metal powder tends to decrease. When the temperature of the heat treatment is too high, the coercive force of the soft magnetic metal powder tends to increase.

A method for confirming the fine structure of the soft magnetic metal powder is not particularly limited. For example, confirmation can be made by using XRD. The fine structure of the soft magnetic metal powder before pressing and the fine structure of the particles contained in the magnetic core after pressing are usually the same.

In the present embodiment, the soft magnetic metal powder having an amorphization rate X of 85% or more represented by the following formula (1) has the structure composed of only an amorphous material or the nano-hetero structure, and the soft magnetic metal powder having an amorphization rate X of less than 85% has the structure composed of crystals.

$$X = 100 - (Ic/(Ic+Ia) \times 100) \quad (1)$$

Ic: scattering integrated intensity of crystal phase

Ia: scattering integrated intensity of amorphous phase

The amorphization rate X is calculated according to the above formula (1) by performing X-ray crystal structure analysis on the soft magnetic metal powder by using XRD to identify a phase, reading a peak (Ic: scattering integrated intensity of crystal phase, Ia: scattering integrated intensity of amorphous phase) of crystallized Fe or a crystallized compound, and calculating a crystallization rate based on the peak intensities. Hereinafter, the calculation method will be described in more detail.

Figure 2:
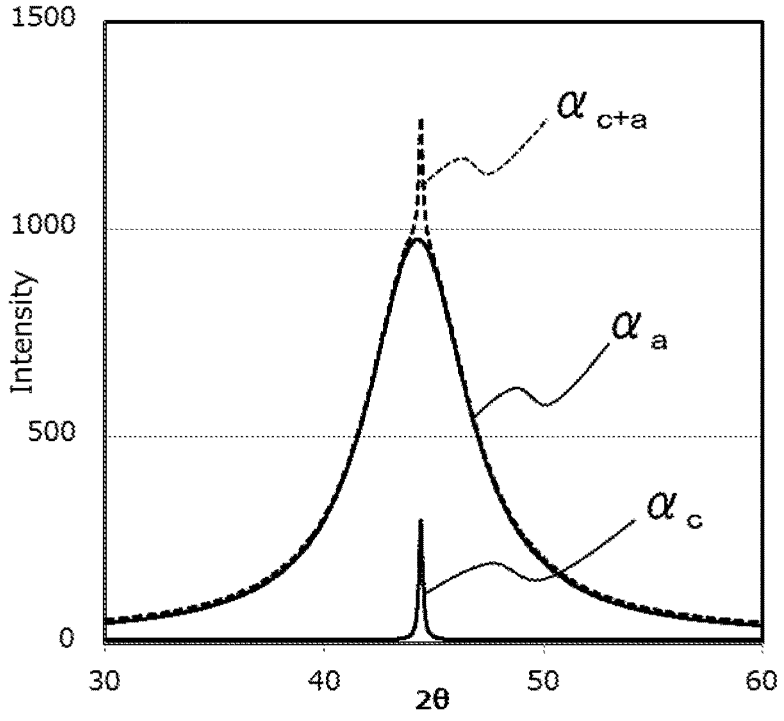
FIG. 2 is an example of a pattern obtained by profile fitting the chart shown in FIG. 1.

The X-ray crystal structure analysis is performed by using XRD on the soft magnetic metal powder according to the present embodiment, and a chart as shown in FIG. 1 is obtained. The chart is profile-fitted using a Lorentz function represented by the following formula (2) to obtain a crystal component pattern ac showing the scattering integrated intensity of crystal phase, an amorphous component pattern $\alpha_a$ showing the scattering integrated intensity of amorphous phase, and a combined pattern thereof $\alpha_{c+a}$, as shown in FIG. 2. From the scattering integrated intensity of crystal phase and the scattering integrated intensity of amorphous phase of the obtained patterns, the amorphization rate X is obtained according to the above formula (1). A measurement range is set to a diffraction angle 2θ=30° to 60° where amorphous-derived halos can be confirmed. Within this range, an error between the integrated intensities actually measured by using XRD and the integrated intensities calculated using the Lorentz function can be within 1%.

$$f(x) = \frac{h}{1 + \frac{(x-u)^2}{w^2}} + b \quad (2)$$

$h$: peak height $u$: peak position $w$: half-value width $b$: background height The soft magnetic metal powder most of which eventually becomes small particles is produced by various powdering methods such as a liquid phase method, a spray pyrolysis method, and a melting method.

The aspect ratio can be changed by further treating the obtained soft magnetic metal powder with a ball mill. Specifically, the soft magnetic metal powder can be deformed by the treatment with a ball mill, and the average aspect ratio of the small particles contained in the finally obtained magnetic core can be increased. The longer a treatment time with the ball mill, the more the soft magnetic metal powder is deformed. The average aspect ratio of the small particles contained in the finally obtained magnetic core may be controlled by mixing the small particles treated by the ball mill and the small particles not treated by the ball mill.

The average particle diameter of the soft magnetic metal powder most of which eventually becomes small particles can be controlled by appropriately removing a coarse powder and/or a fine powder using an air flow classifier.

When producing a magnetic core from the soft magnetic metal powder according to the present embodiment, first, the soft magnetic metal powder most of which eventually becomes large particles and the soft magnetic metal powder most of which eventually becomes small particles are mixed. A mixing method is not particularly limited. A mixing ratio of the soft magnetic metal powder most of which eventually becomes large particles to the soft magnetic metal powder most of which eventually becomes small particles may be, for example, 9:1 to 1:9 by mass ratio.

Next, a resin may be further added to the mixed soft magnetic metal powder if necessary. A ratio of the resin to the entire magnetic core may be 1.5 mass % or more and 5.0 mass % or less. Furthermore, the powder to which the resin is added and mixed may be granulated.

Then, the obtained powder is filled in a mold and compression molding is performed to obtain the magnetic core. Conditions for the compression molding are not particularly limited. The compression molding may be performed at a molding pressure of 1 $t/cm^2$ or more and 8 $t/cm^2$ or less, for example. A filling rate can be controlled by changing the molding pressure.

Although the magnetic core according to the present embodiment has been described above, the magnetic core of the present invention is not limited to the above embodiment.

Applications of the magnetic core of the present invention are also not particularly limited. Examples thereof include coil components (magnetic components) such as an inductor, a choke coil, and a transformer. Furthermore, an electronic device using the magnetic core of the present invention, for example, a DC-DC converter and the like is mentioned.

EXAMPLES

Hereinafter, the present invention will be described based on more detailed Examples, but the present invention is not limited to these Examples.

Experimental Example 1

In Sample Nos. 1 to 28, each soft magnetic metal powder most of which eventually became large particles was prepared by the gas atomizing method. The composition thereof was $Fe_{0.800}Nb_{0.070}B_{0.098}P_{0.030}S_{0.002}$.

At this time, soft magnetic metal powders having an average aspect ratio A1 of the large particles in finally obtained magnetic cores of 1.01, 1.30, 1.50, and 2.00 were prepared while setting the injection amount of the molten metal, the temperature of the molten metal (injection temperature), the injection gas pressure, and the water pressure of the coolant flow to values shown in Table 2. A gas type used was Ar. Other conditions were appropriately controlled so that a number-based average particle diameter (D50) of each of the obtained soft magnetic metal powders was 10.3 μm.

Then, the obtained soft magnetic metal powder was heat-treated. The heat treatment conditions were 600° C. for 1 hour, and the atmosphere during the heat treatment was an Ar atmosphere.

It was confirmed that the number-based average particle diameter (D50) of the obtained soft magnetic metal powder was 10.3 μm. The number-based average particle diameter was measured using a Morphorogi G3. The nanocrystal structure of each soft magnetic metal powder was confirmed using XRD and STEM. After preparing the magnetic core by a method described later using the obtained soft magnetic metal powder, the cross section of the magnetic core was observed using SEM at a size of 10 or more soft magnetic particles. Observation using SEM was repeated so that a total of 100 or more soft magnetic particles were observed. Then, Heywood diameters of 100 or more soft magnetic particles were measured. As a result, the average particle diameter (D50) of the soft magnetic particles in the Heywood diameters was 7.5 μm. Since the soft magnetic metal powder was cut anywhere when cutting the cross section of the magnetic core, the average particle diameter of the soft magnetic particles measured by observing the cross section of the magnetic core is smaller than the average particle diameter of the actual soft magnetic metal powder.

In Sample Nos. 1 to 28, each soft magnetic metal powder most of which eventually became small particles was prepared by the spray pyrolysis method. The composition thereof was Fe (100 at %). The average particle diameter (D50) of the small particle powders was controlled to be 1.5 μm by appropriately removing the coarse powder and/or the fine powder using the air flow classifier. At this time, the soft magnetic metal powder had a shape close to a true sphere. When a magnetic core was produced using this soft magnetic metal powder, the average aspect ratio of the soft magnetic particles was 1.00. After preparing the magnetic core by a method described later using the obtained soft magnetic metal powder, the cross section of the magnetic core was observed using SEM at a size of 10 or more soft magnetic particles. Observation using SEM was repeated so that a total of 100 or more soft magnetic particles were observed. Then, Heywood diameters of 100 or more soft magnetic particles were measured. As a result, the average particle diameter (D50) of the soft magnetic particles in the Heywood diameters was 1.1 μm.

Next, by performing the treatment with the ball mill, soft magnetic metal powders having an average aspect ratio A2 of the small particles in the finally obtained magnetic cores of 1.00, 1.30, 1.50, 1.70, 2.00, 2.50, and 3.00 were prepared. Treatment times are shown in Table 3.

Then, zinc phosphate was used to form a covering portion having an average thickness of 20 nm on the soft magnetic metal powder most of which eventually became large particles. In addition, zinc phosphate was used to form a covering portion having an average thickness of 10 nm on the soft magnetic metal powder most of which eventually became small particles.

Then, the soft magnetic metal powder most of which eventually became large particles and the soft magnetic metal powder most of which eventually became small particles were mixed at a mass ratio of 8:2. If the powder densities are the same, the above mass ratio and an area ratio (S1:52) are approximately the same. It is also possible to calculate the mass ratio of the large particles to the small particles based on the area ratio of the large particles to the small particles and the density of each particle. Furthermore, 3 parts by mass of an epoxy resin diluted with acetone was added to 100 parts by mass of the soft magnetic metal powder obtained by mixing. Then, agglomerates obtained by kneading with a kneader and drying were sized to have an average particle diameter of 355 μm or less in a volume particle diameter distribution to obtain granules. The granules were filled in a mold. The mold had a shape of making the shape of the finally obtained magnetic core to be toroidal.

Next, the soft magnetic metal powder was pressure molded. The molding pressure was controlled so that filling rate of the magnetic core obtained at this time was the value shown in Table 1. Specifically, the molding pressure was controlled in a range of 1 to 8 $t/cm^2$.

For each Experimental Example, a cross section cut parallel to a molding direction (height direction) was observed. Specifically, an observation area was set so that 10 or more large particles could be seen using SEM. The magnification was 1000 times. For each Experimental Example, it was confirmed that the area ratio of the large particles to the total soft magnetic particles contained in the magnetic core was 10% or more, and the area ratio of the small particles to the total soft magnetic particles contained in the magnetic core was 10% or more.

Then, the average aspect ratio A1 of the large particles, the average elliptic circularity of the large particles, the average aspect ratio A2 of the small particles, the maximum value of the Heywood diameter of the soft magnetic particles, the filling rate, the relative magnetic permeability and the withstand voltage property in the magnetic core of each Experimental Example were measured. The A1 and A2, the average elliptic circularity of the large particles, the maximum value of the Heywood diameter, and the filling rate of each magnetic core were calculated based on SEM images. The relative magnetic permeability was measured using impedance/GAIN-PHASE ANALYZER (4194A manufactured by Yokogawa Hewlett-Packard Co., Ltd.). A case where the relative magnetic permeability was higher than 40 was evaluated as good.

For the withstand voltage property of each magnetic core, a pair of In—Ga electrodes was formed on the magnetic core, the pair of In—Ga electrodes was sandwiched between a pair of copper plates, a voltage was applied to the pair of copper plates, and a voltage when a current of 1 mA flowed was evaluated. In the present Experimental Example, a case of 50 V/mm or more was evaluated as good. Results are shown in Table 1.

TABLE 2

| Average aspect ratio A1 of large particles | Injection amount kg/min | Injection temperature ° C. | Gas pressure MPa | Water pressure MPa |
|---|---|---|---|---|
| 1.01 | 1.2 | 1500 | 7.0 | 10.0 |
| 1.30 | 1.0 | 1500 | 7.0 | 10.0 |
| 1.50 | 1.0 | 1500 | 7.0 | 12.5 |
| 2.00 | 1.0 | 1500 | 7.0 | 15.0 |

TABLE 3

| Average aspect ratio A2 of small particles | Treatment time min |
|---|---|
| 1.00 | 0 |
| 1.30 | 10 |
| 1.50 | 30 |
| 1.70 | 45 |
| 2.00 | 60 |
| 2.50 | 90 |
| 3.00 | 120 |

According to Table 1, each Example satisfying all of 1.00≤A1≤1.50, 1.30≤A2≤2.50, and A1<A2 had a significantly improved withstand voltage property as compared with each Comparative Example not satisfying any of 1.00≤A1≤1.50, 1.30≤A2≤2.50, and A1<A2. The filling rates

TABLE 1

| Sample No. | Example/ Comparative Example | Average aspect ratio A1 of large particles | Average elliptic circularity of large particles | Average aspect ratio A2 of small particles | Maximum value of Heywood diameter μm | Filling rate % | Relative magnetic permeability | Withstand voltage property V/mm |
|---|---|---|---|---|---|---|---|---|
| 1 | Comparative Example | 1.01 | 0.951 | 1.00 | 20.0 | 81.1 | 50 | 35 |
| 2 | Comparative Example | 1.30 | 0.952 | 1.00 | 21.2 | 81.2 | 51 | 31 |
| 3 | Comparative Example | 1.50 | 0.952 | 1.00 | 20.4 | 80.9 | 52 | 28 |
| 4 | Comparative Example | 2.00 | 0.953 | 1.00 | 22.3 | 81.2 | 51 | 25 |
| 5 | Example | 1.01 | 0.951 | 1.30 | 21.2 | 80.2 | 50 | 73 |
| 8 | Comparative Example | 2.00 | 0.953 | 1.30 | 20.5 | 80.9 | 52 | 21 |
| 9 | Example | 1.01 | 0.951 | 1.50 | 21.3 | 81.2 | 51 | 92 |
| 10 | Example | 1.30 | 0.952 | 1.50 | 22.3 | 80.2 | 52 | 84 |
| 12 | Comparative Example | 2.00 | 0.953 | 1.50 | 22.1 | 81.2 | 52 | 23 |
| 13 | Example | 1.01 | 0.951 | 1.70 | 21.2 | 81.2 | 51 | 74 |
| 14 | Example | 1.30 | 0.952 | 1.70 | 23.0 | 81.1 | 52 | 63 |
| 15 | Example | 1.50 | 0.952 | 1.70 | 23.2 | 82.2 | 53 | 52 |
| 16 | Comparative Example | 2.00 | 0.953 | 1.70 | 20.3 | 81.2 | 51 | 23 |
| 17 | Example | 1.01 | 0.951 | 2.00 | 20.3 | 81.3 | 50 | 83 |
| 18 | Example | 1.30 | 0.952 | 2.00 | 23.1 | 82.2 | 52 | 74 |
| 19 | Example | 1.50 | 0.952 | 2.00 | 23.2 | 81.1 | 51 | 57 |
| 20 | Comparative Example | 2.00 | 0.953 | 2.00 | 22.0 | 81.2 | 53 | 32 |
| 21 | Example | 1.01 | 0.951 | 2.50 | 22.1 | 81.1 | 53 | 85 |
| 22 | Example | 1.30 | 0.952 | 2.50 | 22.4 | 81.1 | 51 | 66 |
| 23 | Example | 1.50 | 0.952 | 2.50 | 20.4 | 82.1 | 52 | 56 |
| 24 | Comparative Example | 2.00 | 0.953 | 2.50 | 20.7 | 82.2 | 53 | 45 |
| 25 | Comparative Example | 1.01 | 0.951 | 3.00 | 20.8 | 82.2 | 52 | 23 |
| 26 | Comparative Example | 1.30 | 0.952 | 3.00 | 20.7 | 80.2 | 53 | 25 |
| 27 | Comparative Example | 1.50 | 0.952 | 3.00 | 20.8 | 80.1 | 53 | 24 |
| 28 | Comparative Example | 2.00 | 0.953 | 3.00 | 20.9 | 80.3 | 52 | 21 |

were the same in each Example and each Comparative Example, and the relative magnetic permeability was good in each Example.

Experimental Example 2

In Experimental Example 2, conditions were the same as those in Experimental Example 1 except for the points described below. In Experimental Example 2, a gas pressure for preparing the soft magnetic metal powder most of which eventually became large particles was changed. Then, the average particle diameter of the soft magnetic metal powder and the average aspect ratio A1 of the large particles in the finally obtained magnetic core were set to values shown in Table 5. By appropriately removing the coarse powder and/or the fine powder using the air flow classifier, the average particle diameter of the soft magnetic metal powder most of which eventually became small particles was controlled to be the value shown in Table 4. For each Example, it was confirmed that as in Experimental Example 1, the area ratio of the large particles to the total soft magnetic particles contained in the magnetic core was 10% or more, and the area ratio of the small particles to the total soft magnetic particles contained in the magnetic core was 10% or more, that the average elliptic circularity of the large particles was 0.95 or more, and that the soft magnetic metal powder most of which eventually became large particles had a nanocrystal structure.

TABLE 4

| Sample No. | Example/ Comparative Example | Average particle diameter of powders to be large particles µm | Average particle diameter of powders to be small particles µm | Average aspect ratio A1 of large particles | Average aspect ratio A2 of small particles | Maximum value of Heywood diameter µm | Filling rate % | Relative magnetic permeability | Withstand voltage property V/mm |
|---|---|---|---|---|---|---|---|---|---|
| 9 | Example | 10.3 | 1.5 | 1.01 | 1.50 | 20.0 | 81.2 | 51 | 92 |
| 29 | Example | 14.8 | 1.5 | 1.05 | 1.50 | 32.1 | 81.3 | 52 | 86 |
| 30 | Example | 19.9 | 1.5 | 1.10 | 1.50 | 39.8 | 80.9 | 52 | 75 |
| 31 | Example | 25.2 | 1.5 | 1.20 | 1.50 | 50.3 | 81.3 | 54 | 63 |
| 32 | Example | 10.3 | 1.0 | 1.01 | 1.50 | 20.0 | 81.2 | 52 | 98 |
| 33 | Example | 10.3 | 2.0 | 1.01 | 1.50 | 20.0 | 81.3 | 51 | 85 |
| 34 | Example | 10.3 | 2.5 | 1.01 | 1.50 | 20.0 | 81.2 | 51 | 83 |

TABLE 5

| Average particle diameter of powders to be large particles µm | Average aspect ratio A1 of large particles | Injection amount kg/min | Injection temperature ° C. | Gas pressure MPa | Water pressure MPa |
|---|---|---|---|---|---|
| 10.3 | 1.01 | 1.2 | 1500 | 7.0 | 10.0 |
| 14.8 | 1.05 | 1.2 | 1500 | 5.0 | 10.0 |
| 19.9 | 1.10 | 1.2 | 1500 | 3.0 | 10.0 |
| 25.2 | 1.20 | 1.2 | 1500 | 2.0 | 10.0 |

According to Table 4, even when the average particle diameter of the soft magnetic metal powder was changed, each Example satisfying all of $1.00 \leq A1 \leq 1.50$, $1.30 \leq A2 \leq 2.50$, and $A1 < A2$ had a good withstand voltage property despite of a high relative magnetic permeability. The withstand voltage property of other Examples was even better than that of Sample No. 31, in which the maximum value of the Heywood diameter of the soft magnetic particles was more than 40 km.

Experimental Example 3

In Experimental Example 3, the average aspect ratio A1 and the average elliptic circularity of the large particles were controlled by changing the atomizing conditions from Experimental Example 1. The atomizing conditions are shown in Table 7. The atomizing conditions of Sample Nos. 38 to 42 were the same as those of Sample No. 9.

In Experimental Example 3, a soft magnetic metal powder having a nanocrystal structure after the heat treatment same as in Experimental Examples 1 and 2 and a soft magnetic metal powder having a structure composed of only an amorphous material or a nano-hetero structure without a heat treatment were prepared for the soft magnetic metal powder most of which eventually became large particles. When no heat treatment was performed, the number-based average particle diameter (D50) of the soft magnetic metal powder most of which eventually became large particles evaluated by the Morphorogi G3 was 10.4 µm.

Further, in Sample Nos. 39 and 41, regarding the soft magnetic metal powder most of which eventually became small particles, a soft magnetic metal powder was prepared in the same manner as in Experimental Examples 1 and 2 except that the composition thereof was made mainly of Fe and Ni, that is, an atomic number ratio thereof was $Ni_{80}Fe_{20}$. Furthermore, in Sample Nos. 40 and 42, regarding the soft magnetic metal powder most of which eventually became small particles, a soft magnetic metal powder was prepared in the same manner as in Experimental Examples 1 and 2 except that Fe and Si were main components and Cr was further contained, that is, an atomic number ratio thereof was $Fe_{57.1}Si_{28.6}Cr_{14.3}$.

A magnetic core was prepared by appropriately combining the above soft magnetic metal powders. Results are shown in Table 6.

TABLE 6

| Sample No. | Example/ Comparative Example | Average particle diameter of powders to be large particles | Fine structure of large particles | Composition of small particles | Average aspect ratio A1 of large particles | Average elliptic circularity of large particles | Average aspect ratio A2 of small particles | Filling rate % | Relative magnetic permeability | Withstand voltage property V/mm | Injection amount kg/min | Injection temperature ° C. | Gas pressure MP | Water pressure MPa |
|---|---|---|---|---|---|---|---|---|---|---|---|---|---|---|
| 9 | Example | 10.3 | Nanocrystal | Fe | 1.01 | 0.951 | 1.50 | 81.2 | 51 | 92 | 1.2 | 1500 | 7.0 | 10.0 |
| 35 | Example | 10.2 | Nanocrystal | Fe | 1.10 | 0.931 | 1.50 | 81.2 | 51 | 82 | 1.4 | 1500 | 7.0 | 12.5 |
| 36 | Example | 10.4 | Nanocrystal | Fe | 1.10 | 0.913 | 1.50 | 80.9 | 50 | 65 | 1.6 | 1500 | 7.0 | 15.0 |
| 37 | Example | 10.5 | Nano-hetero structure | Fe | 1.01 | 0.952 | 1.50 | 81.3 | 48 | 92 | 1.4 | 1500 | 9.0 | 10.0 |
| 38 | Example | 10.3 | Amorphous | Fe | 1.00 | 0.952 | 1.50 | 81.3 | 45 | 93 | 1.2 | 1500 | 7,0 | 10.0 |
| 39 | Example | 10.3 | Nanocrystal | $Ni_{80}Fe_{20}$ | 1.01 | 0.951 | 1.50 | 81.3 | 54 | 91 | 1.2 | 1500 | 7.0 | 10.0 |
| 40 | Example | 10.3 | Nanocrystal | $Fe_{57.1}Si_{28.6}Cr_{14.3}$ | 1.01 | 0.951 | 1.50 | 81.2 | 51 | 89 | 1.2 | 1500 | 7.0 | 10.0 |
| 41 | Example | 10.3 | Amorphous | $Ni_{80}Fe_{20}$ | 1.00 | 0.951 | 1.50 | 81.3 | 48 | 91 | 1.2 | 1500 | 7.0 | 10.0 |
| 42 | Example | 10.3 | Amorphous | $Fe_{57.1}Si_{28.6}Cr_{14.3}$ | 1.00 | 0.951 | 1.50 | 81.3 | 45 | 89 | 1.2 | 1500 | 7.0 | 10.0 |

TABLE 7

| Sample No. | Average particle diameter of powders to be large particles μm | Fine structure of large particles | Average aspect ratio A1 of large particles | Average elliptic circularity of large particles | Injection amount kg/min | Injection temperature ° C. | Gas pressure MPa | Water pressure MPa |
|---|---|---|---|---|---|---|---|---|
| 9 | 10.3 | Nanocrystal | 1.01 | 0.951 | 1.2 | 1500 | 7.0 | 10.0 |
| 35 | 10.2 | Nanocrystal | 1.10 | 0.931 | 1.4 | 1500 | 7.0 | 12.5 |
| 36 | 10.4 | Nanocrystal | 1.10 | 0.913 | 1.6 | 1500 | 7.0 | 15.0 |
| 37 | 10.5 | Nano-hetero structure | 1.01 | 0.952 | 1.4 | 1500 | 9.0 | 10.0 |

According to Tables 6 and 7, the withstand voltage decreases as the average elliptic circularity of the large particles decreases. Further, even when the composition of the small particles was changed, the withstand voltage property did not change significantly, but when the fine structure of the large particles was a structure composed of only an amorphous material or a nano-hetero structure, the relative magnetic permeability thereof was lower than that of the nanocrystal structure.

Experimental Example 4

In Experimental Example 4, Sample No. 9 was prepared under the same conditions except that the coating thickness of each particle was changed by changing the amount of zinc phosphate added. Results are shown in Table 8.

TABLE 8

| Sample No. | Example/ Comparative Example | Coating thickness of large particles nm | Coating thickness of small particles nm | Filling rate % | Relative magnetic permeability | Withstand voltage property V/mm |
|---|---|---|---|---|---|---|
| 43 | Example | 10 | 10 | 81.2 | 53 | 92 |
| 9 | Example | 20 | 10 | 81.2 | 51 | 92 |
| 44 | Example | 30 | 10 | 81.3 | 49 | 110 |
| 45 | Example | 53 | 10 | 81.2 | 48 | 150 |
| 46 | Example | 100 | 10 | 80.9 | 45 | 160 |
| 47 | Example | 20 | 5 | 82.6 | 57 | 79 |
| 48 | Example | 20 | 20 | 81.2 | 49 | 100 |

TABLE 8-continued

| Sample No. | Example/ Comparative Example | Coating thickness of large particles nm | Coating thickness of small particles nm | Filling rate % | Relative magnetic permeability | Withstand voltage property V/mm |
|---|---|---|---|---|---|---|
| 49 | Example | 20 | 30 | 81.3 | 45 | 150 |
| 50 | Example | 20 | 50 | 81.3 | 43 | 170 |

According to Table 8, the same tendency was observed even when the coating thickness was changed. The larger the coating thickness, the better the withstand voltage property, but the lower the relative magnetic permeability.

Experimental Example 5

In Experimental Example 5, a crystal structure of the soft magnetic metal powder most of which eventually became large particles was changed by controlling the composition and atomizing conditions thereof. The composition and the crystal structure are shown in Table 9. Specifically, the atomizing conditions of Sample Nos. 51 to 56 were the same as the atomizing conditions of Sample No. 1 shown in Table 2. The atomizing conditions of Sample Nos. 57 to 62 were the same as those of Sample No. 1 except that cooling water was not sprayed. No heat treatment was performed on Samples Nos. 51 to 62. Other points were the same as in Experimental Example 1. The composition of the large particles was described in terms of an atomic number ratio. Results are shown in Table 9.

TABLE 9

| Example/ Comparative Example | Composition of large paricles | Crystal structure | Average particle diameter powders to be large particles µm | Average aspect ratio A1 of large particles | Average elliptic circu-larity of large particles | Com-posi-tion of small par-ticles | Av-erage aspect ratio A2 of small par-ticles | Maxi-mum value of Hey-wood diameter µm | Fil-ling rate % | Rela-tive mag-netic perme-ability | With-stand voltage prop-erty V/mm |
|---|---|---|---|---|---|---|---|---|---|---|---|
| Comparative Example | $Fe_{0.8000}Nb_{0.070}B_{0.098}P_{0.030}S_{0.002}$ | Nanocrystal | 10.3 | 1.01 | 0.951 | Fe | 1.00 | 20.0 | 81.1 | 50 | 35 |
| Example | $Fe_{0.8000}Nb_{0.070}B_{0.098}P_{0.030}S_{0.002}$ | Nanocrystal | 10.3 | 1.01 | 0.951 | Fe | 1.30 | 21.2 | 80.2 | 50 | 73 |
| Example | $Fe_{0.8000}Nb_{0.070}B_{0.098}P_{0.030}S_{0.002}$ | Nanocrystal | 10.3 | 1.01 | 0.951 | Fe | 1.70 | 21.2 | 81.2 | 51 | 74 |
| Example | $Fe_{0.8000}Nb_{0.070}B_{0.098}P_{0.030}S_{0.002}$ | Nanocrystal | 10.3 | 1.01 | 0.951 | Fe | 2.00 | 20.3 | 81.3 | 50 | 83 |
| Example | $Fe_{0.8000}Nb_{0.070}B_{0.098}P_{0.030}S_{0.002}$ | Nanocrystal | 10.3 | 1.01 | 0.951 | Fe | 2.50 | 22.1 | 81.1 | 53 | 85 |
| Comparative Example | $Fe_{0.8000}Nb_{0.070}B_{0.098}P_{0.030}S_{0.002}$ | Nanocrystal | 10.3 | 1.01 | 0.951 | Fe | 3.00 | 20.8 | 82.2 | 52 | 23 |
| Comparative Example | $Fe_{0.725}Nb_{0.110}Si_{0.120}Cr_{0.025}C_{0.020}$ | Amorphous | 10.2 | 1.01 | 0.963 | Fe | 1.00 | 22.3 | 81.1 | 46 | 32 |
| Example | $Fe_{0.725}Nb_{0.110}Si_{0.120}Cr_{0.025}C_{0.020}$ | Amorphous | 10.2 | 1.01 | 0.963 | Fe | 1.30 | 21.2 | 81.4 | 44 | 72 |
| Example | $Fe_{0.725}Nb_{0.110}Si_{0.120}Cr_{0.025}C_{0.020}$ | Amorphous | 10.2 | 1.01 | 0.963 | Fe | 1.70 | 21.2 | 81.2 | 45 | 73 |
| Example | $Fe_{0.725}Nb_{0.110}Si_{0.120}Cr_{0.025}C_{0.020}$ | Amorphous | 10.2 | 1.01 | 0.963 | Fe | 2.00 | 22.5 | 81.5 | 45 | 82 |
| Example | $Fe_{0.725}Nb_{0.110}Si_{0.120}Cr_{0.025}C_{0.020}$ | Amorphous | 10.2 | 1.01 | 0.963 | Fe | 2.50 | 22.1 | 81.3 | 45 | 85 |
| Comparative Example | $Fe_{0.725}Nb_{0.110}Si_{0.120}Cr_{0.025}C_{0.020}$ | Amorphous | 10.2 | 1.01 | 0.963 | Fe | 3.00 | 20.7 | 81.4 | 46 | 22 |
| Comparative Example | $Fe_{0.8950}Si_{0.060}Cr_{0.0450}$ | Crystal | 10.3 | 1.01 | 0.970 | Fe | 1.00 | 20.4 | 81.3 | 42 | 38 |
| Example | $Fe_{0.8950}Si_{0.060}Cr_{0.0450}$ | Crystal | 10.3 | 1.01 | 0.970 | Fe | 1.30 | 20.5 | 81.3 | 41 | 77 |
| Example | $Fe_{0.8950}Si_{0.060}Cr_{0.0450}$ | Crystal | 10.3 | 1.01 | 0.970 | Fe | 1.70 | 20.7 | 81.2 | 41 | 78 |
| Example | $Fe_{0.8950}Si_{0.060}Cr_{0.0450}$ | Crystal | 10.3 | 1.01 | 0.970 | Fe | 2.00 | 20.4 | 81.2 | 40 | 91 |
| Example | $Fe_{0.8950}Si_{0.060}Cr_{0.0450}$ | Crystal | 10.3 | 1.01 | 0.970 | Fe | 2.50 | 20.6 | 81.3 | 42 | 92 |
| Comparative Example | $Fe_{0.8950}Si_{0.060}Cr_{0.0450}$ | Crystal | 10.3 | 1.01 | 0.970 | Fe | 3.00 | 20.8 | 81.2 | 41 | 33 |

According to Table 9, each Example satisfying all of $1.00 \leq A1 \leq 1.50$, $1.30 \leq A2 \leq 2.50$, and $A1 < A2$ had a significantly improved withstand voltage property as compared with each Comparative Example not satisfying any of $1.00 \leq A1 \leq 1.50$, $1.30 \leq A2 \leq 2.50$, and $A1 < A2$. The filling rates were the same in each Example and each Comparative Example, and the relative magnetic permeability was good in each Example. In the cases of Examples (Sample Nos. 52 to 55) in which the fine structure of the large particles was composed of only an amorphous material, and Examples (Sample Nos. 58 to 61) in which the fine structure of the large particles was a structure composed of crystals and containing coarse crystals having an crystal grain diameter of more than 100 nm, the relative magnetic permeability was lower than that of Examples (Sample Nos. 5, 13, 17, and 21) in which the fine structure of the large particles was a structure composed of nanocrystals.

Experimental Example 6

In Experimental Example 6, regarding Samples No. 1 and 5, the mixing ratio of the soft magnetic metal powder most of which eventually became large particles to the soft magnetic metal powder most of which eventually became small particles was changed to have the S1:S2 shown in Table 10. Unlike Experimental Examples 1 to 5, the molding pressure was unified to 4 t/cm$^2$, so as to evaluate the change in the filling rate when S1:S2 was changed. Other points were carried out under the same conditions. Results are shown in Table 10.

TABLE 10

| Sample No. | Example/ Comparative Example | Average aspect ratio A1 of large particles | Average elliptic circularity of large particles | Average aspect ratio A2 of small particles | S1:S2 | Maximum value of Heywood diameter µm | Filling rate % | Relative magnetic permeability | Withstand voltage property V/mm |
|---|---|---|---|---|---|---|---|---|---|
| 63 | Comparative Example | 1.01 | 0.951 | 1.00 | 9:1 | 21.2 | 80.2 | 48 | 33 |
| 64 | Example | 1.01 | 0.951 | 1.30 | 9:1 | 21.0 | 80.3 | 48 | 68 |
| 1 | Comparative Example | 1.01 | 0.951 | 1.00 | 8:2 | 20.0 | 81.1 | 50 | 35 |
| 5 | Example | 1.01 | 0.951 | 1.30 | 8:2 | 21.2 | 80.2 | 50 | 73 |
| 65 | Comparative Example | 1.01 | 0.951 | 1.00 | 6:4 | 22.1 | 79.3 | 47 | 42 |
| 66 | Example | 1.01 | 0.951 | 1.30 | 6:4 | 21.2 | 79.3 | 47 | 79 |
| 67 | Comparative Example | 1.01 | 0.951 | 1.00 | 5:5 | 21.0 | 77.5 | 45 | 44 |
| 68 | Example | 1.01 | 0.951 | 1.30 | 5:5 | 20.3 | 77.5 | 45 | 82 |
| 69 | Comparative Example | 1.01 | 0.951 | 1.00 | 4:6 | 20.2 | 76.4 | 44 | 46 |
| 70 | Example | 1.01 | 0.951 | 1.30 | 4:6 | 20.1 | 76.4 | 44 | 93 |
| 71 | Comparative Example | 1.01 | 0.951 | 1.00 | 2:8 | 20.4 | 75.4 | 43 | 49 |

TABLE 10-continued

| Sample No. | Example/ Comparative Example | Average aspect ratio A1 of large particles | Average elliptic circularity of large particles | Average aspect ratio A2 of small particles | S1:S2 | Maximum value of Heywood diameter μm | Filling rate % | Relative magnetic permeability | Withstand voltage property V/mm |
|---|---|---|---|---|---|---|---|---|---|
| 72 | Example | 1.01 | 0.951 | 1.30 | 2:8 | 20.6 | 75.4 | 43 | 101 |
| 73 | Comparative Example | 1.01 | 0.951 | 1.00 | 1:9 | 20.8 | 73.2 | 41 | 51 |
| 74 | Example | 1.01 | 0.951 | 1.30 | 1:9 | 20.4 | 73.3 | 41 | 112 |

According to Table 10, Examples and Comparative Examples in which S1:S2 are identical to each other are compared. Each Example satisfying all of $1.00 \leq A1 \leq 1.50$, $1.30 \leq A2 \leq 2.50$, and $A1 < A2$ had an improved withstand voltage property as compared with each Comparative Example not satisfying any of $1.00 \leq A1 \leq 1.50$, $1.30 \leq A2 \leq 2.50$, and $A1 < A2$.

According to Table 10, when the molding pressure was the same, the filling rate was high when S1:52 was 8:2. The relative magnetic permeability was highest when S1:S2 was 8:2. The larger the ratio of S2 to S1, the better the withstand voltage property. However, the larger the ratio of S2 to S1, the lower the filling rate, and the lower the relative magnetic permeability.

For each Example in Table 10, it was confirmed that the molding pressure was changed between 1 to 8 t/cm$^2$ to change the filling rate. When comparing Examples prepared at the same molding pressure, the filling rate and the relative magnetic permeability were high when S1:S2 was 8:2 at any molding pressure. The larger the ratio of S2 to S1, the better the withstand voltage property. However, the larger the ratio of S2 to S1, the lower the filling rate, and the lower the relative magnetic permeability. Therefore, it was confirmed that a filling property was the best when S1:S2 was 8:2.

What is claimed is:

1. A magnetic core, comprising:

large particles that are soft magnetic particles having a Heywood diameter of 5 μm or more and 25 μm or less in a cross section of the magnetic core; and small particles that are soft magnetic particles having a Heywood diameter of 0.5 μm or more and 3 μm or less in the cross section, wherein $1.00 \leq A1 \leq 1.50$, $1.30 \leq A2 \leq 2.50$, and $A1 < A2$ are satisfied, where an average aspect ratio of the large particles is A1 and an average aspect ratio of the small particles is A2.

2. The magnetic core according to claim 1, wherein a maximum value of a Heywood diameter of soft magnetic particles other than the large particles and the small particles is 40 μm or less in the cross section.

3. The magnetic core according to claim 1, wherein an average elliptic circularity of the large particles in the cross section is 0.93 or more.

4. The magnetic core according to claim 1, wherein the large particles contain nanocrystals.

5. The magnetic core according to claim 1, wherein the small particles contain Fe, and a content of Fe in an entirety of the small particles is 50 at % or more and 100 at % or less.

6. The magnetic core according to claim 1, wherein the small particles contain Fe and at least one selected from Si and Ni, and a total content of Fe, Si, and Ni in an entirety of the small particles is 50 at % or more and 100 at % or less.

7. A magnetic component comprising: the magnetic core according to claim 1.

8. An electronic device comprising: the magnetic core according to claim 1.

* * * * *